No. 693,287. Patented Feb. 11, 1902.
A. VON LOEPER, GEBOREN MÜHLENBECK.
MOWING MACHINE.
(Application filed Oct. 30, 1899.)
(No Model.) 2 Sheets—Sheet 2.
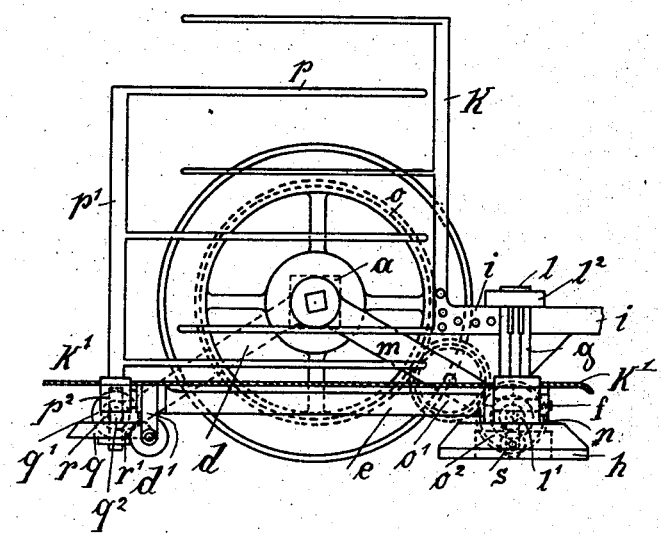
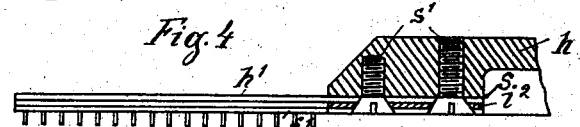
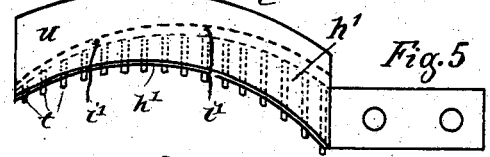
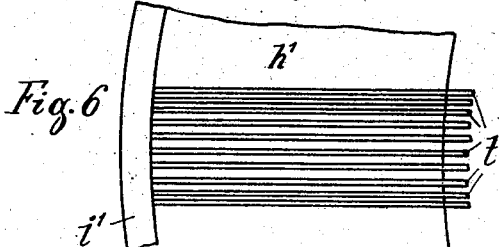
Witnesses.
J. C. Shepherd
David Benzie
Inventor
Anna von Loeper
By
George Cameron Douglas.
Attorney.
THE NORRIS PETERS CO., PHOTO-LITHO., WASHINGTON, D. C.

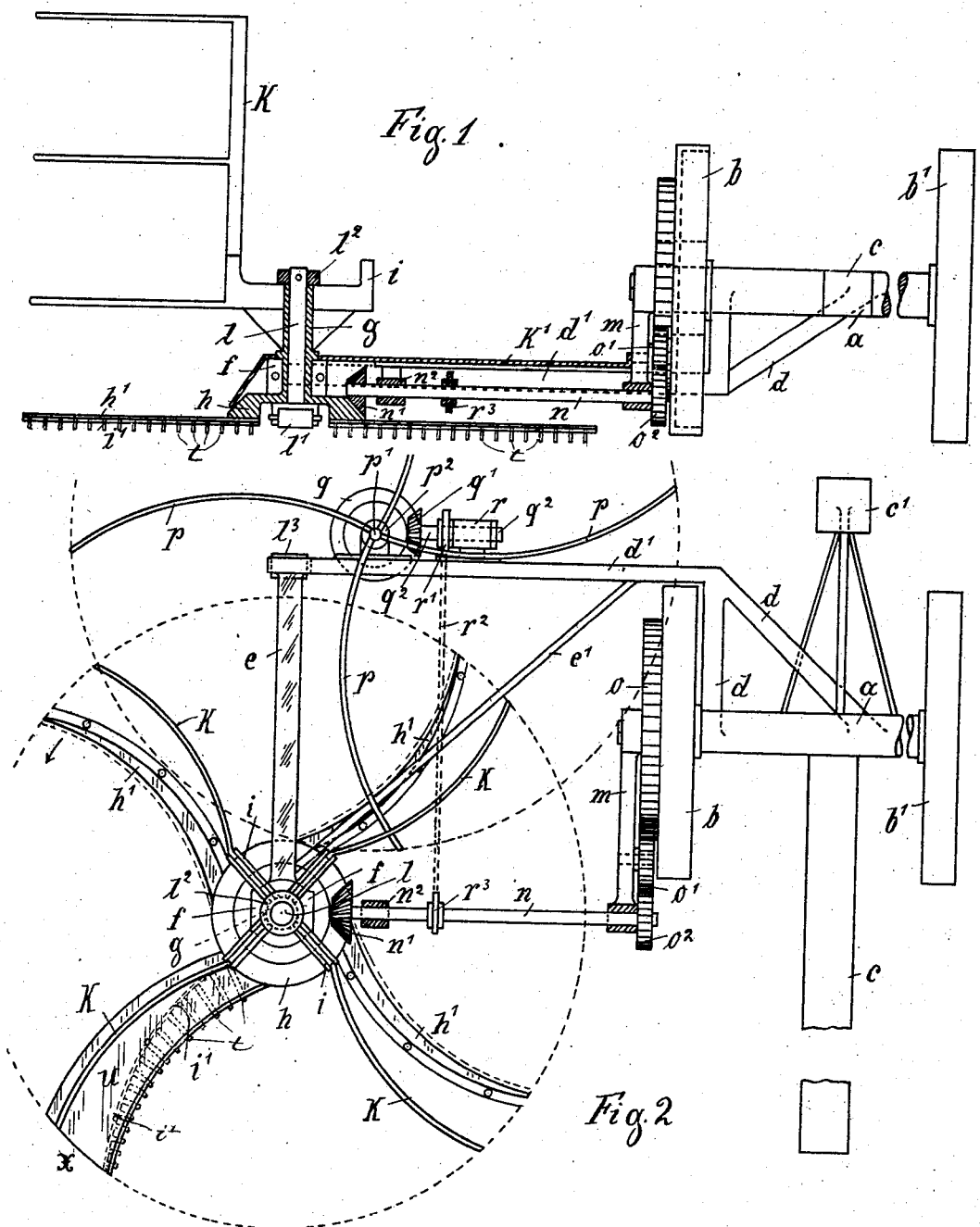

UNITED STATES PATENT OFFICE.

ANNA VON LOEPER, (GEBOREN MÜHLENBECK,) OF ROSTOCK, GERMANY.

MOWING-MACHINE.

SPECIFICATION forming part of Letters Patent No. 693,287, dated February 11, 1902.

Application filed October 30, 1899. Serial No. 735,273. (No model.)

*To all whom it may concern:*

Be it known that I, ANNA VON LOEPER, (née MÜHLENBECK,) gentlewoman, of 51 Paulstrasse, Rostock, Mecklenburg, in the Empire of Germany, have invented a certain new and useful Improvement in Mowing-Machines, of which the following is a specification.

This invention relates to a mowing-machine which is designed to be chiefly used for cutting grain and which is so arranged that the cut grain is conveyed by a rotary rake device in the first place onto the table combined with the machine and thence laid away by a rake which is independent of the former.

The improved machine may of course also be used for mowing grass after slight alterations in the laying device.

Figure 1 shows a transverse section of the machine through the main driving device, the carriage being represented in elevation. Fig. 2 shows a plan of the machine, the table being removed. Fig. 3 is a side elevation looking toward the cutting and raking apparatus. Fig. 4 shows a section of a constructional form of device for fastening the cutters or knives. Fig. 5 is a plan of a cutter or knife. Fig. 6 is a plan, full size, showing part of a cutter or knife with the protecting device belonging thereto; and Fig. 7 is a transverse section.

For moving the cutting and raking apparatus use is made of a carriage drawn by horses in the well-known manner, and which consists of the axle $a$, the wheels $b\ b'$, the shaft $c$ of appropriate length, and the driver's seat $c'$. The shaft is arranged laterally in the known manner in order to have the draft-power of the machine as far as practicable toward the center.

With the axle $a$ is connected the rigid frame $d$ of the machine, which immediately behind the wheel $b$ extends far downward. (See Fig. 1.) To the lateral arm $d'$ of the frame is joined perpendicularly to the same a strong arm $e$, which may, if necessary, be supported by a stay $e'$. The free end of the arm $e$ is made in the form of a two-part bearing $f$, which embraces the hollow shaft $g$. (See Fig. 1.) At its lower end the shaft $g$ carries the cutter or knife head $h$, made in the form of a bevel-wheel and set in rotation in the manner hereinafter described. The upper end of the shaft $g$ is provided with the fork-shaped rake-holders $i$, to which the several arms K of the main rake are attached. The hollow shaft $g$ rotates upon a solid shaft $l$, which is fork-shaped at its lower end and carries a roller $l'$, while the upper end is furnished with a thick sliding ring $l^2$ in order to maintain the shaft in its position. It is evident that the roller $l'$ serves for completely balancing the machine, for which purpose a second roller $l^3$ is also provided at the crossing-point of the arms $e$ and $d'$, Fig. 3.

The knife-head $h$, in which the cutters or knives $h'$ and their protecting devices are fastened, rotates below a plate K', serving as a table, and which bears upon the arm $e$ and also upon the arm $d'$, which plate may be fixed laterally on the side turned toward the wheel $b$ to an arm $m$, which will hereinafter be more particularly described. At the same time the stay $e'$ may be so arranged that it will likewise serve for supporting the table or plate K'.

The operation of the knife-head takes place in the following manner: It has already been observed that the knife-head $h$ is at the same time made in the form of a bevel-wheel and is adapted to engage with a bevel-wheel $n'$, carried upon the horizontal shaft $n$. On the one hand the shaft $n$ is held in a bearing $n^2$, situated below the table, and on the other hand is supported in the free end of the before-mentioned arm $m$, which is suspended from the square end of the carriage-axle $a$. The wheel $b$ is made in one piece with the main driving-wheel $o$, which latter actuates the intermediate wheel $o'$ in order to drive a third wheel $o^2$ on the shaft $n$. It will easily be seen that by this means in the forward movement of the main carriage the knife-head rotates in the direction indicated by an arrow in Fig. 2, it being understood that the wheels $b\ b'$ run, of course, loose upon the axle $a$. On the knife-head $h$ being now set in rotation, the rake-arms K of course turn in the same direction, because the rake-holders $i$, as already stated, are fastened upon the same shaft $g$ as the knife-head. Of course the rotation of the rake-arms takes place above the table K', and it has for its object to convey the cut grain onto the said table. Now in order to lay the cut grain a second rake is provided at the rear of the first and receives a somewhat-greater rotary velocity than this first rake.

The rake possesses a suitable number of rake-arms $p$, secured upon a common shaft $p'$, the latter being held in a bearing $p^2$, which may be attached to the arm $d'$ of the frame of the machine. This rake is actuated by a bevel-wheel $q$, fixed upon the shaft $p'$ and gearing with a similar wheel $q'$, whose shaft $q^2$ is held in a casing $r$, which may likewise be fixed to the arm $d'$. The shaft $q^2$ carries a sprocket-wheel $r'$, which is driven by means of the chain $r^2$ and the sprocket-wheel $r^3$ upon the shaft $n$. (See Figs. 2 and 3.)

It has already been mentioned that the scythe-shaped knives $h'$ are fixed, together with the protecting device, in the knife-head $h$. In Figs. 4 and 5 this mode of fastening is represented to a somewhat-enlarged scale as compared with the other illustrations, and it will be seen that the ends of the knives $h'$ are slid into recesses $s$ (see Fig. 3) of the knife-head and are fixed with the aid of suitable screws $s'$. Of course the mode of fastening the knives may be varied at will, and may, for instance, also be accomplished by springs or catches adapted to be readily released. (Not shown in the drawings.) At the same time as the knives $h'$ the protecting device, hereinafter described, is also held, the requisite distance of the same from the knives $h'$ being obtained by a suitable intermediate part $i^2$.

In order to obviate injury to the knife-edges by stones or the like lying in the field, the protecting device, hereinbefore referred to several times, is provided below each knife. In Figs. 6 and 7 this arrangement is represented full size, while at $x$ in Fig. 2 the complete arrangement in its application to a knife is shown in plan. From these illustrations it will be seen that the protecting device assumes substantially the form of the knife. The former consists of a steel plate furnished with teeth after the manner of a comb, so that small elastic plates $t$ are formed, which lie close together. By reason of their elasticity these small thin plates $t$ can easily give sidewise as soon as a rigid body comes in the way. As, however, they are broad in proportion to their thickness, (see Fig. 7,) they carry away the obstacle, inasmuch as the several teeth coming in direct contact with the obstacle give or yield laterally as long as the stability afforded by the mutual support of the teeth which come under their influence is great enough for pushing the obstacle forward. Accordingly the obstacle is carried away and thrown sidewise below the carriage. Now as the teeth $t$ project a certain distance beyond the edge the latter will never come in direct contact with an obstacle, because owing to the curved arrangement of the comb-teeth along their front line there will be a certain limit to the giving or yielding of the same. For the cutting of grain this protecting device is no obstruction. On the contrary, it facilitates the requisite smooth cut to a great extent in consequence of the fact that the several halms or blades slide into the intermediate spaces between the comb-teeth and are, as it were, held by them until the quickly following knife effects the cutting. Therefore the several halms or blades cannot yield sidewise during the cutting, but are, so to speak, taken hold of by the comb-teeth and held in the cutting plane. It will of course be understood that the aforesaid operation takes place very rapidly.

As after the cutting the grain would fall to the ground and might come into collision with the cutting apparatus, the several knives with a view to obviating this drawback are furnished at their surface with a plate $u$ of appropriate length. (See Figs. 2, 5, and 7.) The plates $u$, however, also serve another purpose, as will hereinafter be set forth when describing the mode of operation of the machine.

The details of the machine which are in a certain and necessary relation with each other having been described, I will now proceed to set forth concisely the operation of the machine.

The carriage is moved along the side of the field to be mowed, thereby setting the wheels $b\ b'$ in rotation. The toothed wheel $o$, connected with the wheel $b$, causes, through the intervention of the wheels $o'$ and $o^2$ and the bevel-wheel $n'$, the rotary movement of the hollow shaft $g$, which in its turn sets the knife-head $h$, together with the knives $h'$ and the protecting device with the rake-arms K, in motion. As shown in Fig. 2, the rake-arms K are in this case so arranged that they will move a certain distance behind the cutting plane of the knives. When the cutting has been effected, the cut halms or blades slide down onto the plate $u$ furnished with the knife, bearing with their upper ear end against the slightly-curved rake-arms K. In the further rotation the rake-arms K convey the cut grain upon the table K', this table, as will be observed, being only about fourteen centimeters away from the ground. For the purpose of facilitating the sliding onto the table above, the latter may be slightly curved at its front edge. The cut grain is now pushed forward a certain distance upon the table by the rake-arms K, the resistance which the air offers preventing the halms or blades of the grain bending forward, which halms or blades are then taken hold of at a certain point of the table by the arms $p$ of the second rake apparatus and are laid away rearward. In this instance the arms $p$ are so arranged that they cannot come into collision with the arms K. (See Fig. 3.) As already explained, the auxiliary rake is set in operation by the sprocket-wheel $r^3$ on the shaft $n$ through the medium of the chain $r^2$, sprocket-wheel $r'$, and bevel-wheel $q'$, which latter is in gear with the bevel-wheel $q$ on the rake-shaft $p'$.

It may be observed that all the rotary parts run in ball or roller bearings, and automatically-operating self-lubricators may be provided at every suitable point, with the object of insuring as easy a movement as practicable.

It has heretofore been assumed that horses or other draft-animals are intended to be used for setting the machine in operation; but it is of course quite obvious that the carriage may also very easily be connected with a benzene, gas, or other motor, whereby the driving of the wheels, and thus the movement of the cutting apparatus, takes place.

The advantages of the improved machine lie in the facility with which obstacles in front of the knives are removed, in the cheap manufacture of all the parts, the light weight, proper working, easy exchange, and easy grinding of the knives, and in the absolutely silent movement.

Having described my invention, what I claim as new, and desire to secure by Letters Patent, is—

1. The combination, in a mowing-machine, of a knife-head $h$, with one or more cutters or knives $h'$, each of which is furnished with a protecting device consisting of an arm $i'$ which carries elastic plates or teeth $t$, such protecting device being carried by the knife-head $h$ and situated below its knife $h'$, the knives and their protecting devices being fastened to the knife-head $h$, and rotating with it, all substantially as set forth.

2. The combination, in a mowing-machine, of a knife $h'$, with a protecting device consisting of a part $i'$, connected to the under part of the knife and constituting the back of the comb, and comb-teeth $t$, these teeth projecting somewhat beyond the cutting edge of such knife and situated underneath same, the knife and the protecting device moving together, as described.

In witness whereof I have hereunto set my hand in presence of two witnesses.

ANNA VON LOEPER, (GEB. MÜHLENBECK.)

Witnesses:
 MARIE MÜHLENBECK,
 RICHARD KIRKER.